(12) United States Patent
Lancewicki et al.

(10) Patent No.: US 11,854,052 B2
(45) Date of Patent: Dec. 26, 2023

(54) FORWARD CONTRACTS IN E-COMMERCE

(71) Applicant: eBay Inc., San Jose, CA (US)

(72) Inventors: Tomer Lancewicki, Jersey City, NJ (US); Ramesh Periyathambi, San Ramon, CA (US)

(73) Assignee: EBAY INC., San Jose, CA (US)

( * ) Notice: Subject to any disclaimer, the term of this patent is extended or adjusted under 35 U.S.C. 154(b) by 178 days.

(21) Appl. No.: 17/396,900

(22) Filed: Aug. 9, 2021

(65) Prior Publication Data
US 2023/0045365 A1 Feb. 9, 2023

(51) Int. Cl.
*G06Q 30/0283* (2023.01)
*G06N 20/00* (2019.01)
*G06Q 30/0601* (2023.01)
*G06Q 30/0201* (2023.01)

(52) U.S. Cl.
CPC ......... *G06Q 30/0283* (2013.01); *G06N 20/00* (2019.01); *G06Q 30/0206* (2013.01); *G06Q 30/0619* (2013.01)

(58) Field of Classification Search
None
See application file for complete search history.

(56) References Cited

U.S. PATENT DOCUMENTS

| | | | | |
|---|---|---|---|---|
| 5,966,126 A * | 10/1999 | Szabo | ................... | G06F 16/338 707/E17.082 |
| 11,605,125 B2 * | 3/2023 | Cella | ....................... | G06F 16/27 |
| 2006/0085408 A1 * | 4/2006 | Morsa | ................ | G06Q 30/0275 |
| 2007/0294158 A1 | 12/2007 | Patel et al. | | |
| 2008/0319920 A1 * | 12/2008 | Levin | ..................... | G06Q 40/06 705/36 R |
| 2009/0055270 A1 * | 2/2009 | Magdon-Ismail | .... | G06F 16/957 705/14.27 |
| 2011/0137792 A1 * | 6/2011 | Mordecai | ............... | G06Q 40/03 705/39 |

(Continued)

OTHER PUBLICATIONS

Kaba, Serkan, and A. C. A. R. Murat. "Designing a System to Analyze Portfolio Risks and to Determine Optimum Margin Requirements." International Journal of Computer Applications 975 (2011): 8887 (Year: 2011).*

(Continued)

*Primary Examiner* — Darlene Garcia-Guerra
(74) *Attorney, Agent, or Firm* — SCHWEGMAN LUNDBERG & WOESSNER, P.A.

(57) ABSTRACT

A method of training a machine learning model to determine an item margin is provided. The method includes monitoring a first value for a first item having attributes and monitoring a first value for a second type of item having attributes where an attribute of the first attributes is the same as an attribute of the second attributes. The method also includes determining a first margin based on the first values. The first attributes, the second attributes, and the first margin are input as training data for the machine learning model where the machine learning model is trained with the training data. The monitoring operations for the first item and the second item are repeated to obtain a second value for the first and second items. Furthermore, the trained machine learning model is applied to the second values to determine a second margin.

11 Claims, 7 Drawing Sheets

(56) References Cited

U.S. PATENT DOCUMENTS

| | | |
|---|---|---|
| 2011/0153521 A1* | 6/2011 | Green .................... G06Q 40/06 705/36 R |
| 2016/0350854 A1* | 12/2016 | Elliott .................... G06Q 40/04 |
| 2019/0244288 A1 | 8/2019 | Singh et al. |
| 2019/0287171 A1* | 9/2019 | Parmar ................. G06F 16/955 |
| 2020/0020015 A1* | 1/2020 | Anders ................ G06Q 10/083 |
| 2020/0065656 A1* | 2/2020 | Song ........................ G06N 3/08 |
| 2020/0074415 A1* | 3/2020 | Jayaram ............... G06Q 20/389 |
| 2021/0065295 A1* | 3/2021 | Kight .................... G06Q 40/04 |
| 2022/0138820 A1* | 5/2022 | Gershon ............ G06Q 30/0611 705/26.4 |

OTHER PUBLICATIONS

Ivacu, Codru-Florin. "Option Pricing Using Machine Learning." Expert Systems With Applications 163 (2021): 113799 (Year: 2021).*

* cited by examiner

FORWARD CONTRACTS IN E-COMMERCE

TECHNICAL FIELD

The subject matter disclosed herein generally relates to training a machine learning model. Specifically, in some examples, the present disclosure addresses systems and methods for training machine learning models to predict futures values for an item.

BACKGROUND

A buyer and seller use forward contracts to agree to a future price for an item to be exchanged between the buyer and seller. At the time of entering into the forward contract, the buyer and seller agree to buy and sell an item at an agreed price at a future time. When the future time arrives, the buyer remits the agreed amount to the seller and the seller provides the item. However, on some occasions, one of the parties may default on the forward contract. For example, when the future date arrives, the buyer may change their mind and decide not to buy the item. Similarly, the seller may decide to not sell the item when the future date arrives. In order to protect both the buyer and seller from default, margin accounts are established. With margin accounts, both the buyer and the seller contribute an amount to their margin accounts. Thus, if default occurs, the non-defaulting party is entitled to the funds in the margin account of the defaulting party.

Typically, an amount that is required to be placed in a margin account is based on the agreed price at the future time. Specifically, an initial margin, which is based on the agreed price, is used to determine an amount that each party should place in the margin account. Furthermore, a maintenance margin, which is based on the initial margin, is used to determine an amount that each party should maintain in the margin account. The agreed price is based on prices paid for similar items in the past. However, on occasion, the item may have unique characteristics where little information exists regarding prices that have been paid for the item in the past. Thus, determining an amount to place in the margin account is very difficult to determine in these cases.

BRIEF DESCRIPTION OF THE DRAWINGS

Some examples are illustrated by way of example and not limitation in the figures of the accompanying drawings.

DETAILED DESCRIPTION

Figure 1:
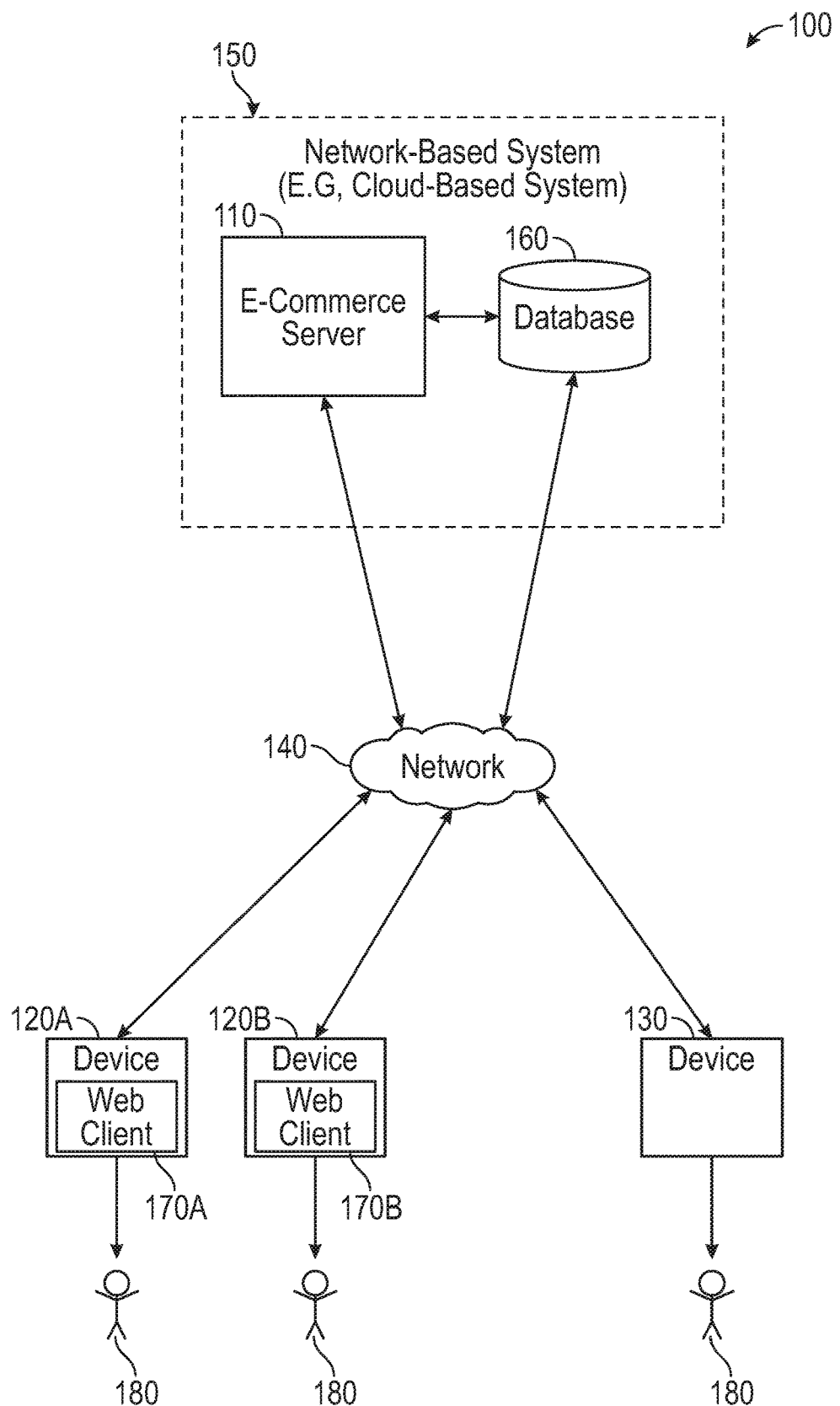
FIG. 1 is a network diagram illustrating a network environment suitable for determining margins for an item, according to some examples.

Examples address the problems noted above by providing a system and method for determining an initial margin for a unique item that is the subject of a forward contract between two parties. The initial margin is determined based on values of other items that have attributes that match attributes of the unique item. In an example, a first value of a first item having a first plurality of attributes is monitored. In addition, a second value for a second item having a second plurality of attributes is monitored. In an example, when the unique item shares an attribute with the first item and with the second item, the first and second values are used to determine the initial margin for the unique item in the forward contract. Moreover, in an example, a maintenance margin is determined based on the initial margin for the unique item.

In an example, a machine learning model is trained to determine the initial margin for the unique item. In particular, the first plurality of attributes, the second plurality of attributes, and the first and second values are input as training data for the machine learning model in order to train the machine learning model. In an example, the trained machine learning model determines the initial margin for the unique item using the first plurality of attributes, the second plurality of attributes, and the first and second values.

Examples relate to determining an initial margin for a unique item that is part of a forward contract between two parties. Examples of unique items include items that are not widely available, such as custom made furniture, a customized vehicle, sports memorabilia autographed by an athlete, and the like. The initial margin is determined based on values of other items that have attributes that match attributes of the unique item. In an example, a first value of a first item is monitored. In an example, the first value can be monitored for any time period. Examples of time periods can include a couple of hours, a couple of days, or a couple of weeks. In addition, a first value for a second item is monitored. The first item has a first set of attributes and the second item has a second set of attributes. In an example, a first value initial margin is determined based on the first value of the first item and the first value of the second item when a first attribute of the first set of attributes matches a second attribute of the second set of attributes. In an example, when the unique item shares an attribute with the first set of attributes and the second set of attributes, the first value initial margin is used as the initial margin for the unique item that is part of the forward contract. Moreover, in an example, a maintenance margin is determined based on the initial margin for the unique item.

A forward contract can relate to a contract between a first buyer and a seller that agree to buy/sell an asset at a future time at a future price that is agreed to at the time of entering into the forward contract. For example, on March 31$^{st}$, the first buyer and the seller may enter into a forward contract where the first buyer and the seller agree that the first buyer will purchase a watch having a black bezel for $10,000 two months later on May $31^{st}$. Thus, on May $31^{st}$, the buyer is responsible for remitting $10,000 to the seller and the seller is responsible for delivering the watch on May $31^{st}$ as consideration for the $10,000. Moreover, the forward contract is worth $10,000.

In the interim (i.e., between March $31^{st}$ and May $31^{st}$), the first buyer may sell the forward contract to a second buyer for $10,500. On May $31^{st}$, the second buyer remits payment of $10,500 to the first buyer, while the first buyer remits $10,000 to the seller and the seller delivers the watch. The seller can deliver the watch to either the first buyer or the second buyer. Here, the first buyer keeps the difference between the forward contract price and the amount received from the second buyer which, in this instance, is $500.

Since the first buyer and the seller are agreeing to a future price of an item, typically, protections are put in place to protect each party. For example, an initial margin is established which is an amount of equity both a buyer and seller should deposit in a margin account in order to initiate the future contract. Typically, the initial margin relates to a percentage of an overall value of an item, such as the value of a forward contract. Both a buyer and a seller contribute an amount of money that is a percentage of the overall value of the forward contract. For example, both the first buyer and the seller each contribute 5% of the value of the future contract to their margin accounts. Thus, the first buyer and the seller each contribute 5% of $10,000, or $500, to their margin accounts for a total of $1,000. In the event that either the first buyer or the seller default on the future contract, the non-defaulting party is entitled to the amount in the defaulting party's margin account. To further illustrate, if the buyer defaults on the future contract (i.e., decides to not purchase the watch on May $31^{st}$), the seller is entitled to the $5000 in the margin account of the buyer. Typically, for non-unique items, such as the aforementioned watch having a black bezel, the initial margin can be predetermined by various entities. An item may be determined to be non-unique where the item is sold in high volumes and the initial margin can be easily established based on the large volume of sales associated with that item.

In instances where the future contract is for an item having a cost that is volatile, such as positive and/or negative price fluctuations, a maintenance margin is typically established. It should be noted that even in instances where an item has a cost that is not volatile (i.e., the price experiences little if any positive and/or negative price fluctuations during a time period), a maintenance margin can be established. The maintenance margin relates to a minimum amount of equity that a buyer and seller must maintain in a margin account established based on the initial margin. Typically, the maintenance margin relates to a percentage of the initial margin. For example, the maintenance margin can be 50% of the initial margin. Thus, in the watch example above, if the maintenance margin is 50%, since the initial margin is $500, the maintenance margin will be $250.

During the period of the forward contract, such as two months in the watch example, in instances where the item has a volatile price, the amount held in the margin account associated with the buyer and the seller can be affected. To further illustrate, in the watch example, the fair market price of the watch may decrease from $10,000 to $9,700. Therefore, the change in value associated with the watch is negative $300. Since a drop in price has a negative impact on the seller (i.e., the selling price drops by $300) and a positive impact on the buyer (i.e., the selling price drops by $300), $300 moves from the margin account balance of the buyer to the margin account balance of the seller. Thus, the margin account balance changes from $500 to $200 for the buyer while the margin account balance for the seller changes from $500 to $800. As noted above, the maintenance margin is $250. Thus, the minimum margin account balance is $250. However, the margin account balance for the buyer is now $200. In this instance, the buyer should add $300 to the margin account balance of the buyer in order to bring the margin account balance back to $500, which is the initial margin.

An issue arising with determining initial margins and maintenance margins relates to the type of item for which the initial margins and the maintenance margins are being established. For non-unique items, such as the aforementioned watch having a black bezel, the maintenance margin can be predetermined by various entities. In particular, a watch having a black bezel can be a fairly common item, where hundreds of watches having black bezels are bought and sold. Thus, a plurality of data points exists with respect to potential price fluctuations. These data points can be used to determine whether or not the cost will be volatile over a specified period of time. Using the plurality of data points, an initial margin and a maintenance margin can be determined. However, for rare and/or unique items, such as a watch having a bezel with multi-colored diamonds, a plurality of data points do not exist with respect to potential price fluctuations. This problem may exist due to the fact that not many watches having a bezel with multi-colored diamonds have been sold. Thus, there may be too few data points in existence and an initial margin and a maintenance margin can be difficult to determine. As noted above, an item can be a unique item, such as the aforementioned custom made furniture and sports memorabilia autographed by an athlete, and the like. In the example of customized furniture, the furniture may be a bed that is configured for tall people. Moreover, there may only be five beds customized for tall people in existence, which may not provide enough data points, In the instance of the sports memorabilia, such as apparel, autographed by an athlete, there may only be twenty pieces of apparel in existence, which may not provide enough data points.

Examples provide a system and method for determining an initial margin and a maintenance margin for unique items having few data points with respect to potential price fluctuations.

FIG. 1 is a network diagram illustrating a network environment 100 suitable for determining initial margins and maintenance margins for unique items, according to some examples. The network environment 100 includes an e-commerce server 110, along with devices 120A, 120B, and 130 communicatively coupled to each other via a network 140. The devices 120A and 120B can be collectively referred to as "devices 120," or generically referred to as a "device 120." The e-commerce server 110 can be part of a network-based system 150 that includes a cloud-based database 160. Examples of the database 160 can include the Simple Storage Service offered by Amazon Web Services™, along with a SwiftStack™ object storage system.

The devices 120 can interact with the e-commerce server 110 using a web client 170A or an app client 170B. The e-commerce server 110, the devices 120, and the device 130 may each be implemented in a computer system, in whole or in part, as described below with respect to FIGS. 9 and 10.

The e-commerce server 110 provides an electronic commerce application to other machines (e.g., the devices 120A, 120B, and 130) via the network 140. The electronic commerce application may provide a way for users to buy and sell items directly to each other, to buy from and sell to the electronic commerce application provider, or both.

Also shown in FIG. 1 are users 180 associated with the devices 120A, 120B, and 130. Throughout this document, reference may be made to the user 180 and the users 180. It should be noted that the term user 180 and the term users 180 are interchangeable with each other. The user 180 may be a human user (e.g., a human being), a machine user (e.g., a computer configured by a software program to interact with the devices 120 and the e-commerce server 110), or any suitable combination thereof (e.g., a human assisted by a machine or a machine supervised by a human). The user 180 is not part of the network environment 100, but is associated with the devices 120 and may be a user of the devices 120 (e.g., an owner of the devices 120A and 120B). For example, the device 120 may be a sensor, a desktop computer, a vehicle computer, a tablet computer, a navigational device, a portable media device, or a smart phone belonging to the user 180. The device 130 may be associated with a different user. Moreover, the user 180 can be a buyer or a seller, where each of the buyer and the seller can be associated with any of the devices 120 and 130. Furthermore, the user 180 may be associated with a user account accessible by the electronic commerce application provided by the e-commerce server 110 via which the users 180 interact with the e-commerce server 110.

In some examples, the e-commerce server 110 can receive values for a plurality of items where the individual items have one or more attributes. Furthermore, as will be discussed in greater detail below, the e-commerce server 110 can function to determine an initial margin for unique items that include attributes where at least one attribute is the same as an attribute of the plurality of attributes for the plurality of items stored thereon. For example, when a buyer and a seller, such as the users 180, are entering into a forward contract for a unique item, the e-commerce server 110 can function to determine and provide an initial margin based on the values for the plurality of items. Moreover, the e-commerce server 110 can function to determine a maintenance margin based on the initial margin and provide the initial margin and the maintenance margin to a buyer and seller for use with a forward contract.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 9 and 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 140 may be any network that enables communication between or among machines, databases, and devices (e.g., the e-commerce server 110 and the devices 120 and 130). Accordingly, the network 140 may be a wired network, a wireless network (e.g., a mobile or cellular network), or any suitable combination thereof. The network 140 may include one or more portions that constitute a private network, a public network (e.g., the Internet), or any suitable combination thereof.

Figure 2:
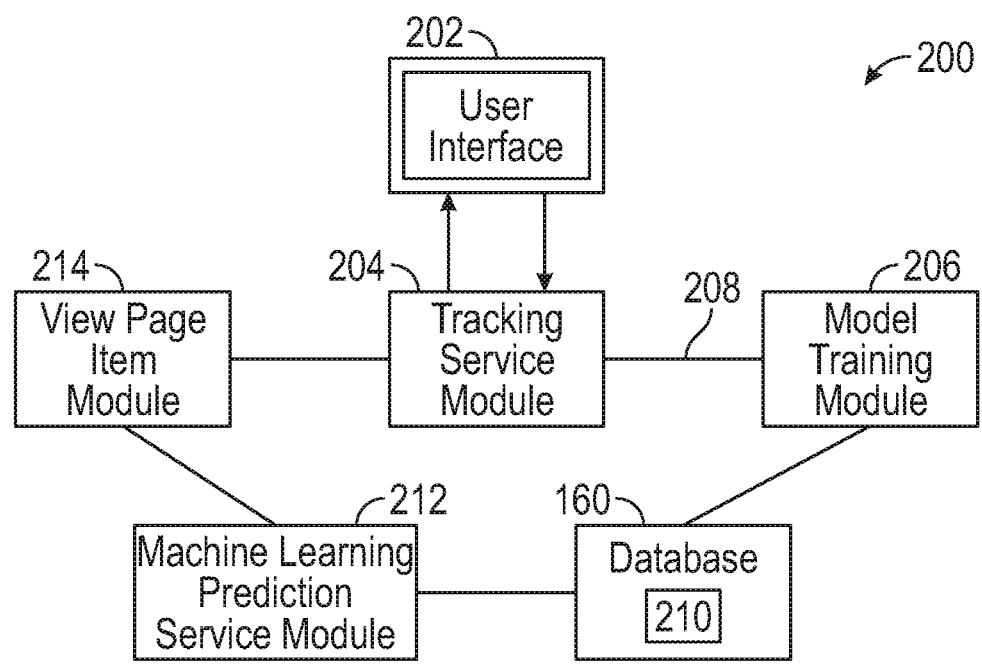
FIG. 2 illustrates an architecture for determining a margin, according to some examples.

Now making reference to FIG. 2, an example of a system architecture 200 that illustrates the interaction between the devices 120A, 120B, and 130 and the e-commerce server 110 is shown in greater detail. The system architecture 200 can include a user interface 202 provided on the devices 120A, 120B, and 130 that allows the user 180 to buy and sell items. Moreover, the system architecture 200 can include a tracking service module 204, a model training module 206, a data pipeline 208, and the database 260 that stores a trained machine learning model 210. In addition, the system architecture 200 includes a machine learning prediction service module 212 and a view page item module 214.

The tracking service module 204 collects metrics associated with items that are bought and sold by the users 180 via the user interface 202. The metrics can include the information about the items, such as a purchase price of the item and the plurality of attributes associated with the items bought and sold by the user 180. The data collected by the tracking module 204 can then be provided to the model training module 206 via the data pipeline 208, such as a Kafka pipeline.

The model training module 206 includes a large data platform that enables solving problems that involves large amounts of data requiring a great amount of computation, such as Apache Hadoop™. The model training module 206 uses machine learning to train the trained machine learning model 210. In an example, the trained machine learning model 210 is generated based on training data using one or more machine learning techniques. Machine learning is the study and construction of algorithms that can learn from, and make predictions on, data. Such algorithms operate by building a model from inputs in order to make data-driven predictions or decisions. Thus, a machine learning technique used by the model training module 206 is used to generate the trained machine learning model 210 based on metrics associated with items bought and sold by the users 180. The trained machine learning model 210 is trained based on multiple attributes described herein. In machine learning parlance, such attributes are referred to as "features." To generate and train a statistical model, a set of features is specified and a set of training data is identified.

Examples are not limited to any particular machine learning technique for generating or training the trained machine learning model 210. Example machine learning techniques include linear regression, logistic regression, neural networks, random forests, naive Bayes, Support Vector Machines (SVMs), XGBoost decision trees, or the like. Further examples of machine learning techniques that can be used include natural language processing such as Bidirectional Encoder Representations from Transformers (BERT). Advantages that machine-learned models have over rule-based models include an ability of machine-learned models to output a probability (as opposed to a number that might not be translatable to a probability), an ability of machine-learned models to capture non-linear correlations between features, and a reduction in bias in determining weights for different features.

As discussed above, the user 180 may desire to determine an initial margin and maintenance margin for an item in a forward contract. When the user 180 desires to determine an initial margin and a maintenance margin, the machine learning prediction service module 212 pulls the trained machine learning model 210 from the database 160 and uses the trained machine learning model 210 to determine an initial margin. Furthermore, the machine learning prediction service module 212 determines a maintenance margin using the initial margin.

The view item page module 214 provides and, in some instances, displays, the initial margin and the maintenance margin determined by the machine learning prediction service module 212 to the user 180. Furthermore, in an example, the view item page module 214 can display a price history for items that were previously bought and sold by the users 180.

In an example, the system architecture 200 can provide a feedback loop where initial margins are continually updated based on changing values of items that are bought and sold. As will be discussed below, the feedback loop and the accompanying changing values may be used to determine different initial margins in real time based on the changing values of the items.

Figure 3:
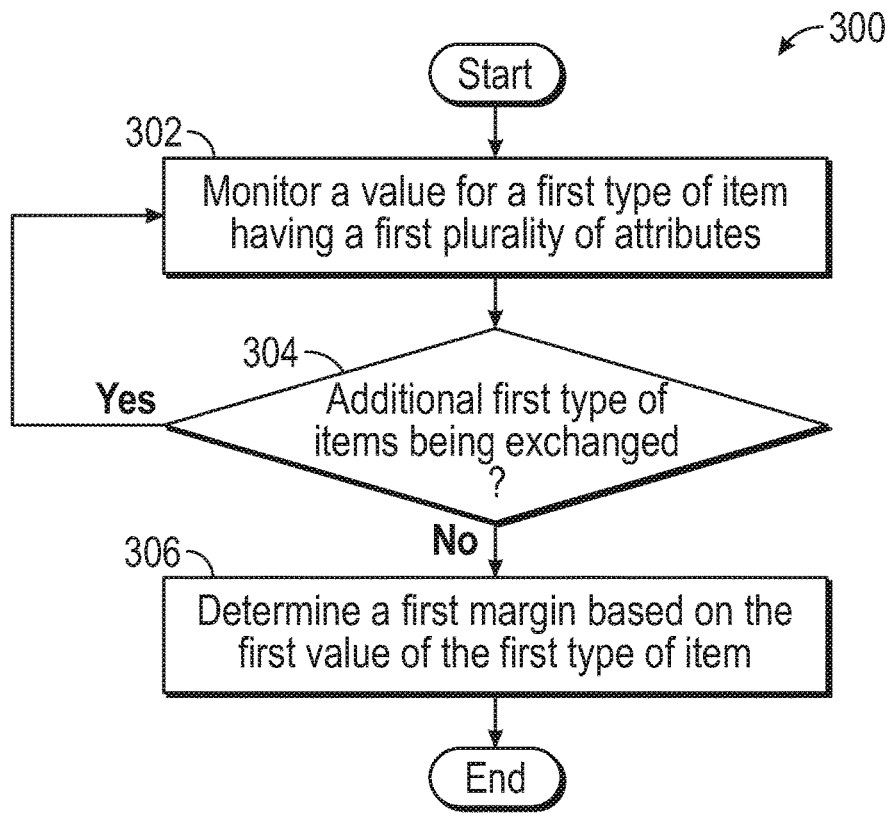
FIG. 3 illustrates a method 300 for determining an initial margin of an item being bought and sold by users and updating a training model with this determination using the system architecture of FIG. 2, according to some examples.

An example of the system architecture 200 being used to determine an initial margin will now be discussed with reference to FIG. 3 and a method 300 for determining an initial margin of an item that is being bought and sold by the users 180 and updating a training model with this determination. The item can include anything that is transferable between any type of entities, such as a buyer and a seller. Moreover, the item can be of a particular type and include a plurality of attributes. Examples of items that may bought and sold by the users 180 include shoes, where the shoes correspond to the type and the shoes have a plurality of attributes. For example, the user 180 may buy or sell certain types of shoes, where the attributes could be one of running shoes, basketball shoes, oxfords, sandals, or the like. Moreover, another attribute can be a particular color, a particular brand, a particular size, or the like. In addition, the item may have certain unique attributes, such as, in the case of basketball shoes, being worn by a particular basketball player during a particular game, such as a championship basketball game. For example, the user may have sold red Adidas™ basketball shoes that are a size 10. Moreover, the shoes may have been worn by a famous point guard during a championship basketball game.

In an operation 302, a first value for a first type of item having a first plurality of attributes are monitored. During the operation 302, the user devices 120A, 120B, and 130 interact with the tracking service module 204 via an application programming interface where the tracking service module 204 collects metrics associated with items that are bought and sold by the users 180 at the user interface 202. The metrics can include the information about the items, such as a first value of the item that corresponds to a purchase price of the item along with a type of the item. In addition, the metrics can include a plurality of attributes associated with the items bought and sold by the user 180. The data collected by the tracking module 204 can then be provided to the model training module 206 as discussed above. Once the operation 302 is complete, the method 300 performs an operation 304 where a determination is made if additional first type of items are being exchanged, such as being bought and sold. The operation 304 may be performed over a fixed period of time or may continue indefinitely.

Figure 4:
FIG. 4 illustrates items having attributes that are being exchanged between entities, according to some examples.

In a first example of the present disclosure, during the operation 302, a pair 400A (FIG. 4) of red Adidas™ basketball shoes that are a size 10 are being bought and sold between the users 180 for $135. The value of $135 is being monitored by and collected by the tracking module 204 and then provided to the model training module 206 during the operation 302. In the operation 304, a determination is made that additional pairs 400B-400N (FIG. 4) of red Adidas™ basketball shoes that are a size 10 are being bought and sold between the users 180. Moreover, in this example, a hundred pairs of red Adidas™ basketball shoes that are a size 10 are bought and sold between the users 180 where the values are in a range of $135 and $165 for an average price of $150.

Once a determination is made in the operation 304 that no additional first type of items are being exchanged in the operation 304, an operation 306 can be performed where a first margin, such as an initial margin, based on the first values of the first type of item is determined. In the example, as noted above, the price for a pair of red Adidas™ basketball shoes that are a size 10 are being bought and sold between the users 180 was in a range of $135 and $165 for an average price of $150. During the operation 306, the method 300 determines that a price volatility associated with red Adidas™ basketball shoes that are a size 10 is 10%. In particular, the price for the pair of red Adidas™ basketball shoes that are a size 10 were in a range that was either 10% below $150 (i.e., $135) or 10% above $150 (i.e., $165). Thus, the volatility in the first example is 10% and the initial margin can be set at 10%.

During the operation 306, the model training module 206 can update a trained machine learning model with these metrics. In an example, the trained machine learning model can be used to determine that a price volatility associated with red Adidas™ basketball shoes that are a size 10 is 10%. Based on determining that the price volatility is 10%, the initial margin can be set at 10% for a pair of red Adidas™ basketball shoes that are a size 10.

The model training module 206 uses machine learning to identify patterns in prices for various items having various characteristics and provides the trained machine learning model 210 that can be used to predict future prices for unique items having at least one attribute that is same as an attribute for the items where the unique items also have attributes that are different from attributes of the various items. The model training module 206 analyzes the metrics associated with the items (i.e., the trained machine learning module 206 analyzes the purchase price of the item along with the plurality of attributes associated with the item). Based on this analysis, the model training module 206 trains the trained machine learning model 210 to determine initial margins for the unique items based on items having an attribute that is the same as an attribute that is same as an attribute for the unique item.

Figure 5:
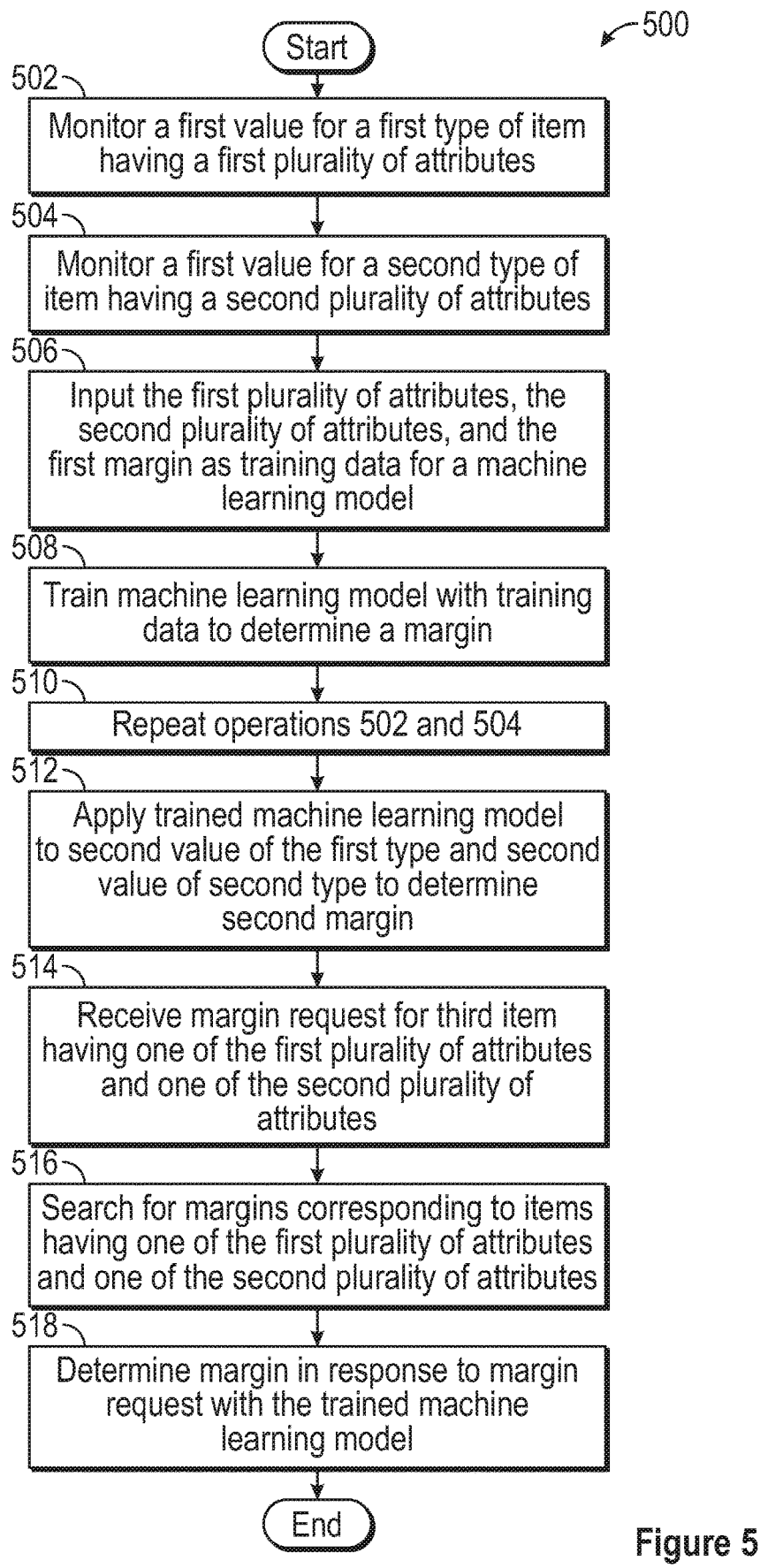
FIG. 5 illustrates a method for training a machine learning model to determine initial margins for unique items, according to some examples.

An example of the trained machine learning module 206 training the trained machine learning model 210 to determine initial margins for unique items is shown with reference to FIG. 5 and the method 500. In an operation 502 a first value for a first type of item having a first plurality of values is monitored. As a second example of the present disclosure, during the operation 502, the values for the pairs of shoes 400A-400N that are being bought and sold by the users 180 are being monitored by the model training module 206 and used to train the trained machine learning model 210. In the second example, there are a hundred pairs of shoes 400A-400N, which correspond to red Adidas™ basketball shoes that are a size 10 and are being bought and sold between the users 180 where the values are in a range of $135 and $165 for an average price of $150.

Figure 6:
FIG. 6 illustrates items having attributes that are being exchanged between entities, according to some examples.

Returning to FIG. 5 and the method 500, after performing the operation 502, an operation 504 is performed where a first value for a second type of item having a second plurality of attributes is monitored. Returning to the second example, during the operation 504, the users 180 may be buying and selling hundreds of shoes 600A-600N as shown in FIG. 6, which correspond to a type, where the attributes include the shoes being basketball shoes of the Nike™ brand and being blue. Moreover, in this example, the attributes can include the shoes being a size 10 that are bought/sold in a price range between $150 and $210 for an average price of $180.

With values for the first and second type of items monitored in the operations 502 and 504, the method 500 performs an operation 506, where the first values for the first and second items are input as training data to train a machine learning model. With the training data, the machine learning model is trained with the training data to determine margins in an operation 508. In an example, an initial margin is determined based on a volatility of a price for an item. In particular, different values at which the same item was exchanged are examined to determine a value range for the item during a time period. Using the range of values and the distribution among the value range, a volatility in the value, such as how much variation from a set price can occur, may be determined and can be used as the initial margin.

To further illustrate, in the second example, in the operation 502, values for a hundred pairs of the shoes 400A-400N were monitored where the values were in a range of $135 and $165 for an average price of $150. In the second example, the average price is also the mean value. Moreover, in the second example, the shoes 400A-400N are red Adidas™ basketball shoes that are a size 10. In the second example, the model training module 206 can update the trained machine learning model 210 with these metrics in the operation 506.

Furthermore, in the second example, in the operation 504, values for a hundred pairs of the shoes 600A-600N where the values monitored were in a price range between $144 and $216 for an average price of $180, which is also the mean value. In the second example, the model training module 206 can update the trained machine learning model 210 with these metrics in the operation 506. In the second example, the shoes 600A-600N are basketball shoes of the Nike™ brand that are a size 10 that are blue in color. In the second example, the model training module 206 can update the trained machine learning model 210 with these metrics in the operation 506.

After completion of the operation 506, the method 500 performs an operation 508 where the trained machine learning model is trained with the training data to determine an initial margin in the second example. During the operation 508, the trained machine learning model 210 can be used to determine that a price volatility associated with red Adidas™ basketball shoes that are a size 10 is 10%. In the second example, as noted above, the training data reflected that the values for the shoes 400A-400N ranged from $135 and $165 for an average price of $150, which was the mean value. Thus, the values vary by 10% from the mean, which, in the second example, corresponds to the initial margin for red Adidas™ basketball shoes that are a size 10 and the trained machine learning model 210 is trained to determine that the initial margin is 10% using this training data.

Moreover, in the second example, the training data reflected that the values for the shoes 600A-600N were in a price range between $144 and $216 for an average price of $180. Here, the values vary by 20% from the mean, which in the second example, corresponds to the initial margin for blue Nike™ basketball shoes that are a size 10 and the trained machine learning model 210 is trained to determine that the initial margin is 20% with this training data.

In an example, these values may be stored at the database 160. Thus, when a request for an initial margin for a pair of red Adidas™ basketball shoes that are a size 10 or a pair of blue Nike™ basketball shoes that are a size 10 is received, the value for the initial margin can be pulled from the database 160.

Returning to FIG. 5 and the method 500, after the machine learning model is trained with the training model to determine a margin in an operation 508, the operations 502 and 504 can be repeated to obtain a second value for the first type of item and a second value for the second type of item in an operation 510. Afterwards, in an operation 512, the trained machine learning is applied to the second value of the first type for the first type of item and to the second value for the second type of item in order to determine a second margin.

In the second example, during the operation 510, values for fifty pairs of red Adidas™ basketball shoes that are a size 10 and that are being bought and sold between the users 180 are being monitored where the values are in a range of $153 and $187 for an average price of $170. Moreover, during the operation 510, values for fifty pairs of blue Nike™ basketball shoes that are a size 10 and that are being bought and sold between the users 180 are being monitored where the values are in a range of $152 and $109 for an average price of $190.

During the operation 512, in the second example, the trained machine learning model is applied to the values for the fifty pairs of red Adidas™ basketball shoes that are a size 10 to determine that the initial margin is again 10%. Moreover, during the operation 512, in the second example, the trained machine learning model is applied to the values for the fifty pairs of blue Nike™ basketball shoes that are a size 10 to determine that initial margin is again 20%.

Returning to FIG. 5 and the method 500, as noted above, the method 500 relates to determining an initial margin for a unique item. In an operation 514, a margin request for a third item having one of the attributes of the first plurality of attributes associated with first type of item and one of the second plurality of attributes associated with the second type of item is received. In an example, since the item is unique, too few exchanges, or none at all, may have occurred such that an initial margin has not been previously determined or is incapable of being determined due to the small amount of exchanges (i.e., buying and selling) of the unique item. Therefore, the trained machine learning model determines an initial margin using initial margins for items having attributes where an attribute of the third item is the same as at least one attribute of the attributes for the items for which an initial margin was determined.

After receiving a margin request in the operation 514, the method 500 performs an operation 516 where margins corresponding to items having one of the first plurality of attributes and one of the second plurality of attributes are searched. To further illustrate, returning to the second example, a request to receive an initial margin for a pair of blue Adidas™ basketball shoes that are size 10 is received in the operation 514. Here, the item type corresponds to shoes and the attributes include basketball shoes, the color blue, the Adidas™ brand, and the size 10. In the second example, very few exchanges (i.e., very few sales) have occurred for blue Adidas™ basketball shoes that are size 10. Thus, an initial margin may not be available for blue Adidas™ basketball shoes that are a size 10.

As such, in the operation 516, margins for items, such as other shoes, having a least one attribute that is the same as at least one attribute of the pair of blue Adidas™ basketball shoes that are size 10 are searched. Thus, shoes having a combination of the attributes basketball shoes, being blue, being of the Adidas™ brand, and/or being a size 10 are searched. In the second example, as noted above, the shoes 400A-400N are red Adidas™ basketball shoes that are a size 10. Therefore, the shoes 400A-400N are the same type (i.e., shoes) and share the attributes of being basketball shoes, being of the Adidas™ brand, and being a size 10. Moreover, in the second example, as noted above, the shoes 600A-600N are blue Nike™ basketball shoes that are a size 10. Therefore, the shoes 600A-600N are the same type (i.e., shoes) and share the attributes of being basketball shoes, being blue, and being a size 10. Thus, a determination is made in the operation 516 that the shoes 400A-400N and 600A-600N have ones of the first plurality of attributes and ones of the second plurality of attributes.

After operation 516, the method 500 performs an operation 518 where an initial margin is determined in response to the margin request. Moreover, in an example, a maintenance margin can also be determined based on the initial margin. In an example, the maintenance margin can be a preset percentage of the initial margin. To further illustrate, the maintenance margin can be preset to be in a range of 30%-60% of the initial margin. In an example, the initial margin is determined using the margins associated with the first and second items found in the operation 516.

Returning to the second example, the initial margin for the shoes 400A-400N was determined to be 10% while the initial margin for the shoes 600A-600N was determined to be 20%. Using the trained machine learning model 210 a determination is made that the initial margin should be 15%. In particular, using initial margins along with the type and attributes associated with the shoes 400A-400N and 600A-600N, the trained machine learning module 210 determines that the initial margin should 15%. In an example, the trained machine learning module 210 can use linear regression, logistic regression, neural networks, random forests, naive Bayes, Support Vector Machines (SVMs), XGBoost decision trees, or the like with the initial margins along with the type and attributes associated with the shoes 400A-400N and 600A-600N to determine that the initial margin should be 15% in the operation 518. Moreover, in the second example, the method 500 determines that the maintenance margin should be 50% of the initial margin. Upon completion of the operation 518, the method 500 is complete.

As discussed above, the method 500 can be used to determine an initial margin for a unique item. While the items described above with reference to FIG. 5 related to shoes where the unique aspect related to a particular color, examples envision covering any type of item having any type of unique aspects. In particular, the items can relate to any type of item that is exchangeable between two parties and the unique aspect can relate to any attribute associated with the item that is exchangeable between two parties.

Figure 7:
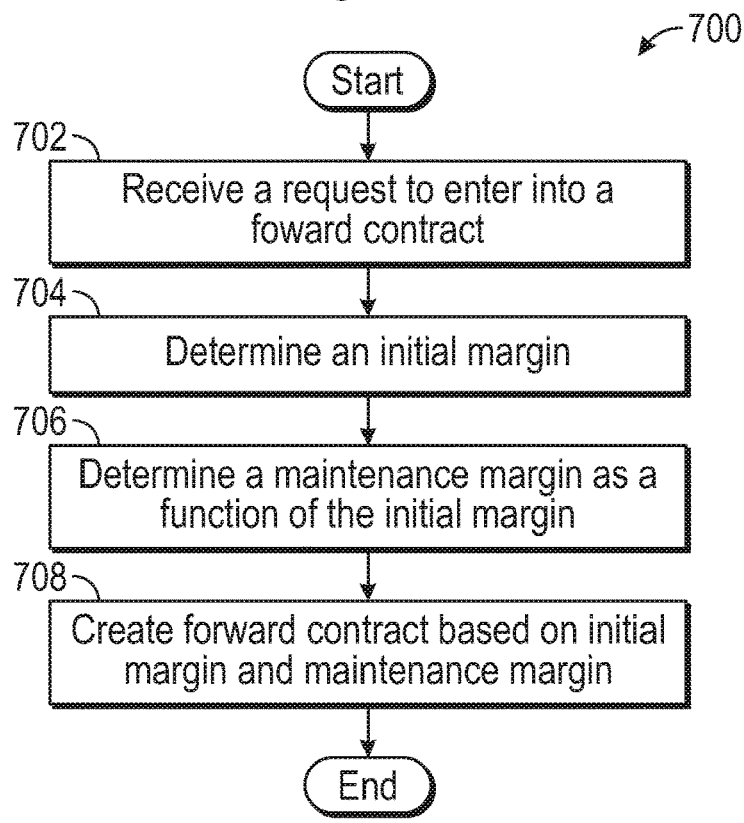
FIG. 7 illustrates a method for entering into a forward contract, according to some examples.
Figure 8:
FIG. 8 is a user interface that may be implemented by a user to engage in a forward contract with another user, according to some examples.

The system 100 of FIG. 1 can be used to create a forward contract between a buyer and a seller according to a method 700 as shown with reference to FIG. 7. Now making reference to FIG. 7, a method 700 for entering into a forward contract in accordance with examples is disclosed. In an operation 702, a request to enter into a forward contract is received. In a third example of the present disclosure, a buyer and a seller may wish to enter into a forward contract for a pair of shoes 800, as shown with reference to FIG. 8. In the example, the pair of shoes 800 can be a unique item, where the pair of shoes are lime green Adidas™ basketball shoes that are a size 10. Moreover, the buyer and the seller agree to a forward contract value 802 of $200, which corresponds to the agreed upon price of the pair of shoes 800. In the operation 702, in the third example, the buyer selects a button 804, which begins the process for the creation of the forward contract.

Returning to the method 700 and FIG. 7, after a request is received to enter into a forward contract at the operation 702, an initial margin associated with the forward contract is determined in an operation 704. As discussed above, the initial margin is an amount of equity both the buyer and seller should deposit in a margin account in order to initiate the future contract. As noted above, typically, the initial margin relates to a percentage of an overall value of an item, such as the value of a forward contract. The initial margin is provided by both the buyer and the seller in order to protect the buyer if the seller unexpectedly backs out of the future contract. Likewise, the initial margin is provided by both the buyer and the seller in order to protect the seller if the buyer unexpectedly backs out of the future contract. In an example, the initial margin is determined in the operation 704 as discussed above with reference to FIG. 5 and the method 500.

Once the initial margin is determined in the operation 704, a maintenance margin can be determined in an operation 706. As noted above, the maintenance margin relates to a percentage of the initial margin. In the operation 706, the trained machine learning model 210 can be trained to determine that the maintenance margin is 50% of the numerical value of the initial margin for the forward contract.

Returning back to the third example, during the operation 702, the trained machine learning model 210 determines that an initial margin for the forward contract should be 15%. Furthermore, in the operation 704, the trained machine learning model 210 is trained to assign a maintenance margin of 50% of the numerical value of the initial margin for the forward contract. In the third example, the forward contract value is $200. Moreover, the initial margin was determined as 15% in the operation 702, which is $30. Thus, the maintenance margin is determined to be $15 in the operation 706. According, the buyer must place $45 in a margin account associated with the buyer and the seller must place $45 is a margin account associated with the seller. Moreover, should a value of the margin account drop below $15, the party associated with the margin account should replenish the margin account to a value equivalent to the initial margin (i.e., $45). Once the maintenance margin is determined in the operation 706, a forward contract is created based on the initial margin and the maintenance margin in operation 708 and the method 700 is complete.

In an example, the model training module 206 continuously updates the trained machine learning model 210. In particular, the users 180 may be continuously buying and selling items having a plurality of attributes. The metrics associated with the items being continuously bought and sold by the users 180 are provided to the model training module 206 via the tracking module 204 and the data pipeline 208. Moreover, the model training module 206 uses reinforcement learning with the continuously provided metrics to update and refine the machine learning model. Thus, an output provided using the machine learning model can vary over time. For example, at a first time interval $T_1$, one hundred other sellers may have sold red Adidas™ basketball shoes that are a size 10 between $135 and $165 for an average price of $150. In an example, the model training module 206 can update a machine learning model with these metrics.

In an example, the machine learning model can be used to determine that a price volatility associated with red Adidas™ basketball shoes that are a size 10 is 10%. Based on determining that the price volatility is 10%, the e-commerce server 110 can set 10% as an initial margin using the techniques detailed above.

Moreover, the e-commerce server 110 can determine a maintenance margin based on the initial margin. For example, the e-commerce server 110 can set the maintenance margin as 50% of the initial margin. Thus, at the first time interval $T_1$, when the e-commerce server 110 receives a request for an initial margin for red Adidas™ basketball shoes that are a size 10, the machine learning model will provide an output that the initial margin should be 10% along with a maintenance margin based on the initial margin.

However, at a second time interval $T_2$, further transactions can occur for other pairs of red Adidas™ basketball shoes that are a size 10. In these transactions, at the second time interval $T_2$, one hundred sellers have sold red Adidas™ basketball shoes that are also a size 10 between $127.5 and $172.50 for an average price of $150. In an example, the model training module 206 can update the machine learning model with this updated data.

The machine learning model can be used to determine that volatility associated with a price of red Adidas™ basketball shoes that are a size 10 is now 15%. Based on determining that the price volatility is 15%, the e-commerce server 110 can set 15% as an initial margin using the techniques detailed above.

Moreover, the e-commerce server 110 can determine a maintenance margin based on the initial margin. For example, the e-commerce server 110 can set the maintenance margin as 50% of the initial margin. Thus, at the second time interval $T_2$, when the e-commerce server 110 receives a request for an initial margin for a pair of red Adidas™ basketball shoes that are a size 10, the trained machine learning model 210 will provide an output of 15%.

In an example, the machine training module 206 can update the machine learning model in real time to reflect changing values of items. Therefore, the model training module 206 uses reinforcement learning to continually update the trained machine learning model 210 that can be used to determine initial margins. In particular, the tracking service module 204 continually provides metrics to the model training module 206 such that the model training module 206 uses the continually provided metrics to train the machine leaning model used to determine initial margins for items. As such, the model training module 206 continuously updates the trained machine learning model 210.

Figure 9:
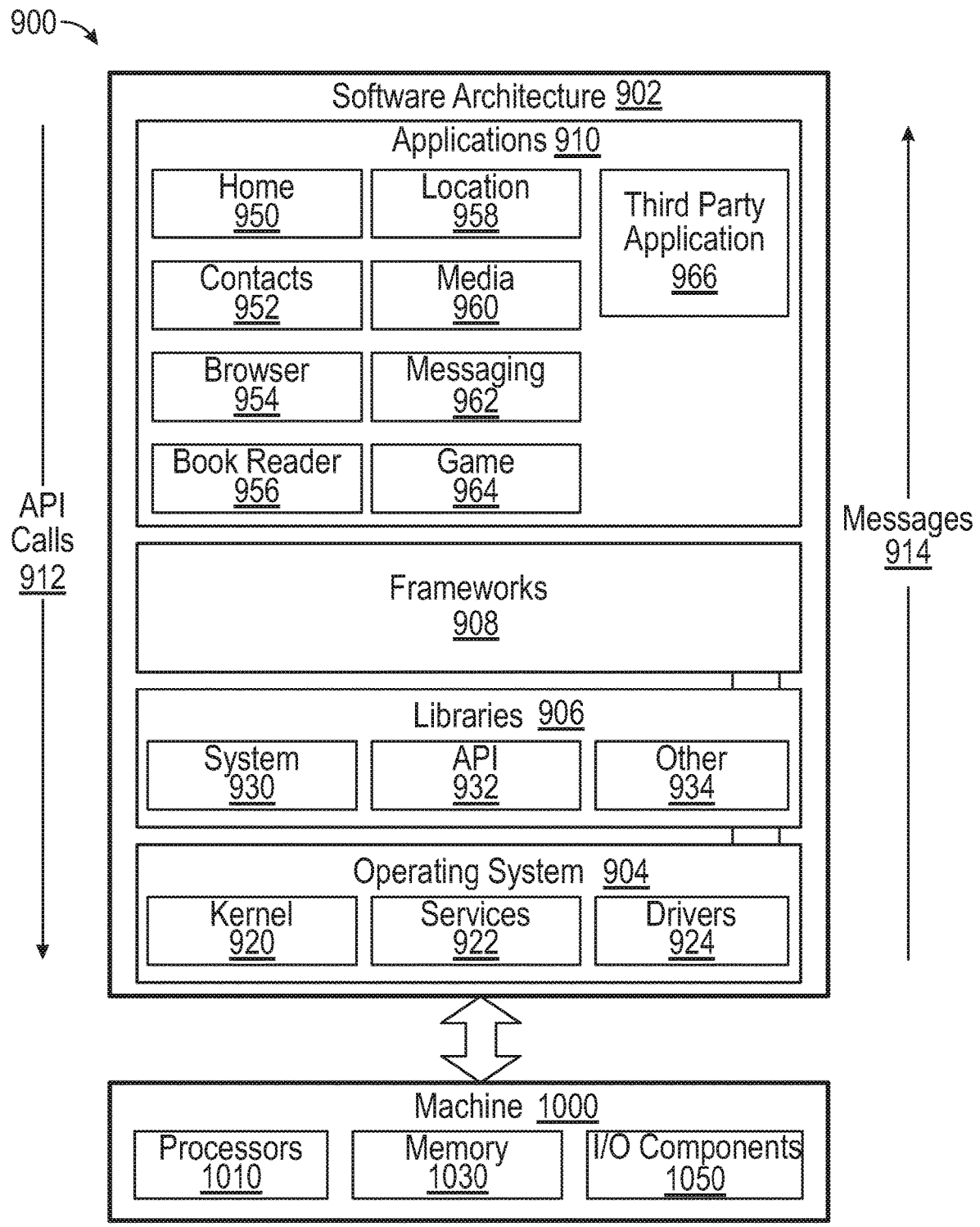
FIG. 9 is a block diagram illustrating an example of a software architecture that may be installed on a machine, according to some examples.

FIG. 9 is a block diagram 900 illustrating a software architecture 902, which may be installed on any one or more of the devices described above. FIG. 9 is merely a non-limiting example of a software architecture, and it will be appreciated that many other architectures may be implemented to facilitate the functionality described herein. The software architecture 902 may be implemented by hardware such as a machine 1000 of FIG. 10 that includes processors 1010, memory 1030, and I/O components 1050. In this example, the software architecture 902 may be conceptualized as a stack of layers where each layer may provide a particular functionality. For example, the software architecture 902 includes layers such as an operating system 904, libraries 906, frameworks 908, and applications 910. Operationally, the applications 910 invoke application programming interface (API) calls 912 through the software stack and receive messages 914 in response to the API calls 912, according to some implementations.

In various implementations, the operating system 904 manages hardware resources and provides common services. The operating system 904 includes, for example, a kernel 920, services 922, and drivers 924. The kernel 920 acts as an abstraction layer between the hardware and the other software layers in some implementations. For example, the kernel 920 provides memory management, processor management (e.g., scheduling), component management, networking, and security settings, among other functionality. The services 922 may provide other common services for the other software layers. The drivers 924 may be responsible for controlling or interfacing with the underlying hardware. For instance, the drivers 924 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 906 provide a low-level common infrastructure that may be utilized by the applications 910. The libraries 906 may include system libraries 930 (e.g., C standard library) that may provide functions such as memory allocation functions, string manipulation functions, mathematic functions, and the like. In addition, the libraries 906 may include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 may also include a wide variety of other libraries 934 to provide many other APIs to the applications 910.

The frameworks 908 provide a high-level common infrastructure that may be utilized by the applications 910, according to some implementations. For example, the frameworks 908 provide various graphic user interface (GUI) functions, high-level resource management, high-level location services, and so forth. The frameworks 908 may provide a broad spectrum of other APIs that may be utilized by the applications 910, some of which may be specific to a particular operating system or platform.

In an example, the applications 910 include a home application 950, a contacts application 952, a browser application 954, a book reader application 956, a location application 958, a media application 960, a messaging application 962, a game application 964, and a broad assortment of other applications such as a third-party application 966. According to some examples, the applications 910 are programs that execute functions defined in the programs. Various programming languages may be employed to create one or more of the applications 910, structured in a variety of manners, such as object-orientated programming languages (e.g., Objective-C, Java, or C++) or procedural programming languages (e.g., C or assembly language). In a specific example, the third-party application 966 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 966 may invoke the API calls 912 provided by the mobile operating system (e.g., the operating system 904) to facilitate functionality described herein.

Figure 10:
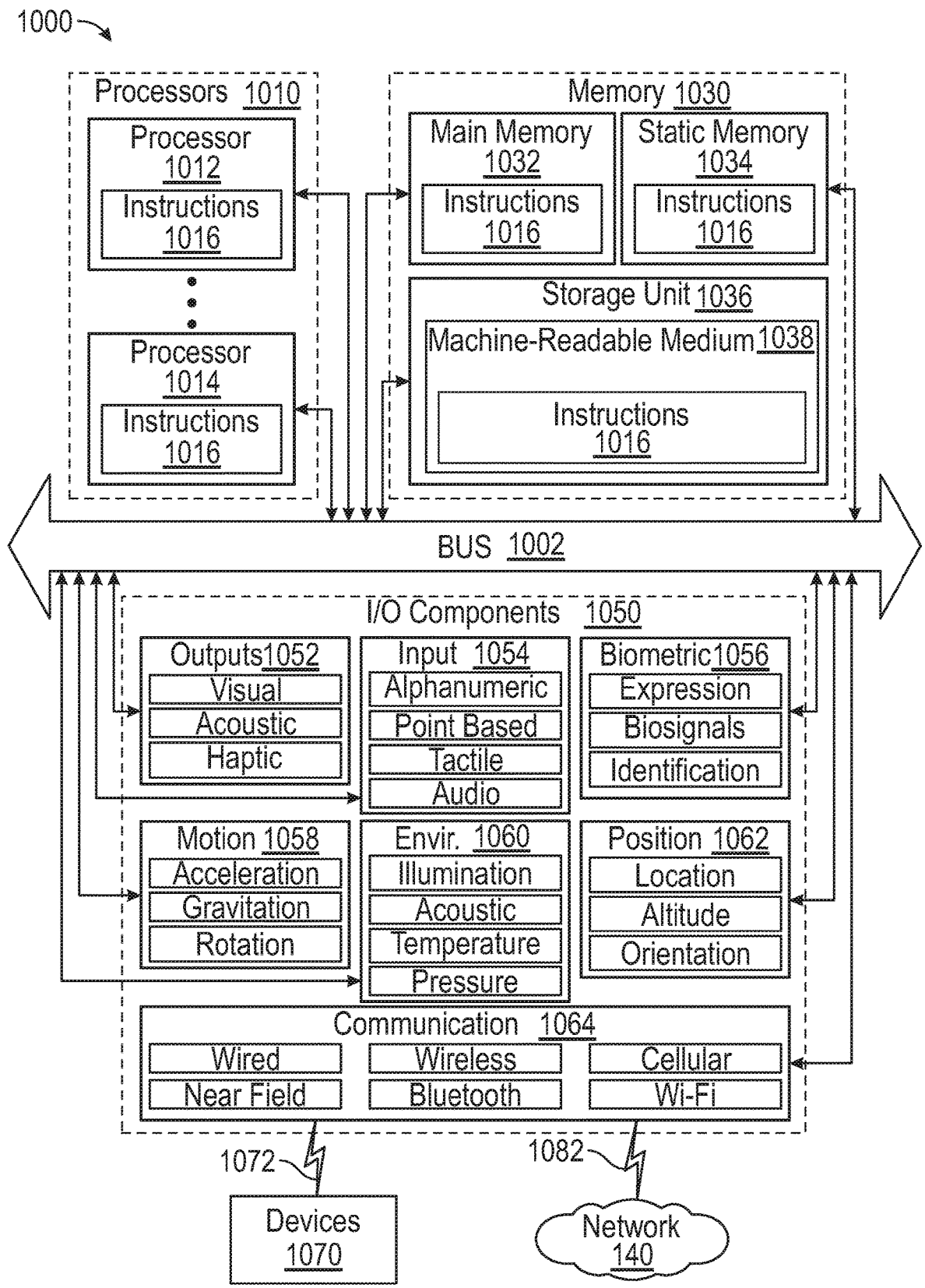
FIG. 10 is a diagrammatic representation of a machine in the form of a computer system within which a set of instructions may be executed for causing the machine to perform any one or more of the methodologies discussed herein, according to an example.

FIG. 10 is a block diagram illustrating components of a machine 1000, according to some examples, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. In alternative examples, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other via a bus 1002. In an example, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (also referred to as "cores") that may execute instructions contemporaneously. Although FIG. 9 shows multiple processors, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036 accessible to the processors 1010 via the bus 1002. The storage unit 1036 may include a machine-readable medium 1038 on which are stored the instructions 1016 embodying any one or more of the methodologies or functions described herein. The instructions 1016 may also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various implementations, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 may include many other components that are not shown in FIG. 9. The I/O components 1050 are grouped according to functionality merely for simplifying the following discussion and the grouping is in no way limiting. In various examples, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further examples, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, the communication components 1064 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, in some implementations, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 1064, such as location via Internet Protocol (IP) geolocation, location via Wi-Fi® signal triangulation, location via detecting an NFC beacon signal that may indicate a particular location, and so forth.

In various examples, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In examples, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other examples, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 as "non-transitory" should not be construed to mean that the medium is incapable of movement; the medium should be considered as being transportable from one physical location to another. Additionally, since the machine-readable medium 1038 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific examples, various modifications and changes may be made to these examples without departing from the broader scope of examples of the present disclosure. Such examples of the inventive subject matter may be referred to herein, individually or collectively, by the term "invention" merely for convenience and without intending to voluntarily limit the scope of this application to any single disclosure or inventive concept if more than one is, in fact, disclosed.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. The specification and drawings are, accordingly, to be regarded in an illustrative rather than a restrictive sense.

What is claimed is:

1. A computer-implemented method of training a machine learning model to determine an item margin, the method comprising:
monitoring, at a tracking service module in a system architecture, a first value for a first type of item having a first plurality of attributes during a first time interval;
monitoring, at the tracking service module, a first value for a second type of item having a second plurality of attributes during the first time interval where at least an attribute of the first plurality of attributes is the same as an attribute of the second plurality of attributes;
determining, at a machine learning prediction service module in the system architecture, a first margin based on the first value for the first type of item and the first value for the second type of item;
inputting, at a model training module in the system architecture, the first plurality of attributes, the second plurality of attributes, and the first margin as training data for the machine learning model;
training, at the model training module, the machine learning model with the training data for the first time interval;
applying, at the machine learning prediction service module, the trained machine learning model to the first value for the first type of item and to the first value for the second type of item in order to determine a second margin;
repeating, at the tracking service module, the monitoring operations for the first type of item and the second type of item to obtain a second value for the first type of item and a second value for the second type of item during a second time interval;
updating, at the model training module, the machine learning model with the second value for the first type of item and the second value for the second type of item using reinforcement learning such that the machine learning model changes over time;
receiving a margin request relating to a third item having a third plurality of attributes, where at least one attribute of the third plurality of attributes is the same as an attribute of the first plurality of attributes and an attribute of the second plurality of attributes and the third plurality of attributes includes another attribute that is different from attributes in the first plurality of attributes and in the second plurality of attributes;
determining, at the machine learning prediction service module, a third initial margin for the third item based on the second margin using the updated machine learning model; and
continuously repeating, at the tracking service module, the monitoring operations for the first type of item and the second type of item to obtain additional values for the first type of item and additional values for the second type of item during additional time intervals; and
continuously updating, at the model training module, the updated machine learning model with the additional values for the first type of item and the additional values for the second type of item using the reinforcement learning such that the updated machine learning model continuously changes over time, where the system architecture creates a feedback loop and margins change with the updated machine learning model based on changing values.

2. The method of claim 1, further comprising determining a maintenance margin based on the second margin, wherein the maintenance margin is a percentage of the second margin and is a minimum amount of equity to be maintained in a margin account established based on the second margin.

3. The method of claim 1, wherein training the machine learning model with the training data comprises using one of logistic regression analysis or natural language processing.

4. The method of claim 1, further comprising:
receiving a request to enter into a forward contract between a first entity and a second entity for one of the first type of item or the second type of item; and
determining a maintenance margin for a margin account associated with each of the first entity and the second entity, wherein the maintenance margin is a percentage of the second margin and is a minimum amount of equity to be maintained in the margin account associated with each of the first entity and the second entity.

5. A non-transitory machine-readable medium having instructions embodied thereon, the instructions executable by a processor of a machine in a system architecture to perform operations comprising:
monitoring, at a tracking service module in the system architecture, a first value for a first type of item having a first plurality of attributes during a first time interval;
monitoring, at the tracking service module, a first value for a second type of item having a second plurality of attributes during the first time interval where at least an attribute of the first plurality of attributes is the same as an attribute of the second plurality of attributes;
determining, at a machine learning prediction service module in the system architecture, a first margin based on the first value for the first type of item and the first value for the second type of item;

inputting, at a model training module in the system architecture, the first plurality of attributes, the second plurality of attributes, and the first margin as training data for the machine learning model;
training, at the model training module, the machine learning model with the training data for the first time interval;
applying, at the machine learning prediction service module, the trained machine learning model to the first value for the first type of item and to the first value for the second type of item in order to determine a second margin;
repeating, at the tracking service module, the monitoring operations for the first type of item and the second type of item to obtain a second value for the first type of item and a second value for the second type of item during a second time interval;
updating, at the model training module, the machine learning model with the second value for the first type of item and the second value for the second type of item using reinforcement learning such that the machine learning model changes over time;
at least one attribute of the third plurality of attributes is the same as an attribute of the first plurality of attributes and an attribute of the second plurality of attributes and the third plurality of attributes includes another attribute that is different from attributes in the first plurality of attributes and in the second plurality of attributes;
determining, at the machine learning prediction service module, a third initial margin for the third item based on the second margin using the updated machine learning model; and
continuously repeating, at the tracking service module, the monitoring operations for the first type of item and the second type of item to obtain additional values for the first type of item and additional values for the second type of item during additional time intervals; and
continuously updating, at the model training module, the updated machine learning model with the additional values for the first type of item and the additional values for the second type of item using the reinforcement learning such that the updated machine learning model continuously changes over time, where the system architecture creates a feedback loop and margins change with the updated machine learning model based on changing values.

6. The non-transitory machine-readable medium of claim 5, the operations further comprising determining a maintenance margin based on the second margin, wherein the maintenance margin is a percentage of the second margin and is a minimum amount of equity to be maintained in a margin account established based on the first margin.

7. The non-transitory machine-readable medium of claim 5, wherein training the machine learning model with the training data comprises using one of logistic regression analysis or natural language processing.

8. The non-transitory machine-readable medium of claim 5, the operations further comprising:
receiving a request to enter into a forward contract between a first entity and a second entity for one of the first type of item and the second type of item; and
determining a maintenance margin for a margin account associated with each of the first entity and the second entity, wherein the maintenance margin is a percentage of the second margin and is a minimum amount of equity to be maintained in the margin account associated with each of the first entity and the second entity.

9. A device, comprising:
a processor; and
memory including instructions that, when executed by the processor, cause the device to perform operations including:
monitoring, at a tracking service module of the device, a first value for a first type of item having a first plurality of attributes during a first time interval;
monitoring, at the tracking service module, a first value for a second type of item having a second plurality of attributes during the first time interval where at least an attribute of the first plurality of attributes is the same as an attribute of the second plurality of attributes; determining, at a machine learning prediction service module of the device, a first margin based on the first value for the first type of item and the first value for the second type of item;
inputting, at a model training module of the device, the first plurality of attributes, the second plurality of attributes, and the first margin as training data for the machine learning model;
training, at the model training module, the machine learning model with the training data for the first time interval;
applying, at the machine learning prediction service module, the trained machine learning model to the first value for the first type of item and to the first value for the second type of item in order to determine a second margin;
repeating, at the tracking service module, the monitoring operations for the first type of item and the second type of item to obtain a second value for the first type of item and a second value for the second type of item during a second time interval;
updating, at the model training module, the machine learning model with the second value for the first type of item and the second value for the second type of item using reinforcement learning such that the machine learning model changes over time;
at least one attribute of the third plurality of attributes is the same as an attribute of the first plurality of attributes and an attribute of the second plurality of attributes and the third plurality of attributes includes another attribute that is different from attributes in the first plurality of attributes and in the second plurality of attributes;
determining, at the machine learning prediction service module, a third initial margin for the third item based on the second margin using the updated machine learning model; and
continuously repeating, at the tracking service module, the monitoring operations for the first type of item and the second type of item to obtain additional values for the first type of item and additional values for the second type of item during additional time intervals; and
continuously updating, at the model training module, the updated machine learning model with the additional values for the first type of item and the additional values for the second type of item using the reinforcement learning such that the updated machine learning model continuously changes over time where the device creates a feedback loop and margins change with the updated machine learning model based on changing values.

10. The device of claim 9, wherein the instructions further cause the device to perform operations including determining a maintenance margin based on the second margin, wherein the maintenance margin is a percentage of the second margin and is a minimum amount of equity to be maintained in a margin account established based on the first margin.

11. The device of claim 9, wherein the instructions further cause the device to perform operations including:
- receiving a request to enter into a forward contract between a first entity and a second entity for one of the first type of item and the second type of item; and
- determining a maintenance margin for a margin account associated with each of the first entity and the second entity, wherein the maintenance margin is a percentage of the second margin and is a minimum amount of equity to be maintained in the margin account associated with each of the first entity and the second entity.

\* \* \* \* \*